United States Patent Office 3,438,864
Patented Apr. 15, 1969

3,438,864
PRODUCTION OF CELLULASE, ANTIBIOTIC
AND ANTI-TUMOR SUBSTANCES BY GROW-
ING EUMYCES ATCC 16425
Moses D. Tendler, 4 Cloverdale Lane,
Monsey, N.Y. 10952
No Drawing. Filed Jan. 19, 1966, Ser. No. 521,532
Int. Cl. C12b *1/00;* C12d *13/10*
U.S. Cl. 195—66     6 Claims

ABSTRACT OF THE DISCLOSURE

Antibiotic and antitumor substances and a cellulase enzyme are produced by growing a new strain of a thermophilic mold the Eumyces group in a sterile liquid medium containing assimilable sources of carbon and nitrogen.

---

This invention relates to novel biological products and methods of producing them.

The new substances are obtained by culturing a new strain of a thermophilic mold of the Eumyces group at temperatures in the range from about 30° to about 60° C. in a sterile liquid medium containing assimilable sources of carbon and nitrogen.

The new strain has been deposited in the American Type Culture Collection under the number 16425. It has the taxonomic characteristics of *Myriococcum albomyces* (Thermophilic Fungi—Cooney and Emerson—W. H. Freeman and Company, 1964, pages 51–61). It grows well on peptone iron agar medium (Difco) at 30° to 60° C. with the production of white spores.

The optimum temperature from the production of the new biological products is in the range from about 45° to about 50° C. The culture medium contains a cellulose-splitting enzyme which converts cellulose to more soluble products and eventually to sugar, and also an antibiotic substance which has anti-tumor properties or which is accompanied by an anti-tumor substance which has not yet been separated from the antibiotic substance.

For optimum production of the cellulase and of the antibiotic-antitumor substances, respectively, the nutrient medium and culture conditions are advantageously varied as indicated in the following illustrative examples:

Example I—Production of cellulose

The following culture medium is used:

| | Percent |
|---|---|
| Soya hulls | 0.5 |
| Sodium carboxymethylcellulose (7LP) | 0.1 |
| $KNO_3$ | 0.2 |
| $(NH_4)_2SO_4$ | 0.1 |
| $Na_2HPO_4$ | 0.1 |
| $MgSO_4 \cdot 7H_2O$ | 0.05 |
| $FeSO_4$ | 0.1 |
| $CaCO_3$ | 0.4 |
| Microelement solution (mg.) [1] | 1.0 |

[1] Microelement stock solution per ml.:

| | Mg. |
|---|---|
| Fe as $Fe(NH_4)_2SO_4$ | 1.0 |
| Zn as $ZnSO_4$ | 1.0 |
| Mn as $MnSO_4$ | 0.5 |
| Cu as $CuSO_4$ | 0.08 |
| Co as $CoSO_4$ | 0.1 |
| B as $H_3BO_3$ | 0.1 |

The culture medium has a pH of about 6.5.
The culture medium is inoculated with a subculture of the organism and fermented for 6–10 days at 45–50° C. with aeration at about 3 liters of air per minute per liter of medium.

The filtered or centrifuged culture medium is salted with about 65% of ammonium sulfate to separate the cellulase enzyme. As measured by the carboxymethylcellulose test, 100 gamma per ml. of the enzyme (dry salt-free basis) causes a reduction in viscosity of 75% in 15 minutes. At 50° to 60° C. approximately 40% of the CMC is converted to glucose in 15 hours as measured by the glucostat assay.

Sucrose, xylose, glucose, rhamnose, cellobiose, mannose, maltose, starch, salicin and sodium acetate provide acceptable carbon sources. Leucine and tryptophane are preferred nitrogen sources for the organism.

Example II—Production of antibiotic-antitumor substance

To maximize the production of the antibiotic-antitumor substance the soya hulls of the culture of Example 1 are replaced by the same amount of Danish herring powder and the fermentation is carried out with reduced aeration, for example, 0.5 liter per minute per liter of medium.

The antibiotic-antitumor substance may be separated from the fermented beer in a number of ways:

(1) The filtered or centrifuged beer may be salted with 55% of ammonium sulfate and the active substance extracted from the precipitate with organic solvents, such as acetone, methanol or propanol.

(2) The active substance may be separated from the filtered or centrifuged beer, preferably after concentration by freeze-thawing, on an adsorbent medium such as Sephadex G-75 and extracting wtih an organic solvent such as acetone, methanol or propanol.

(3) The entire crude beer including mycelium may be extracted in a vibrating extraction column with one or more water-immiscible solvents such as ethyl acetate, methyl chloride and dimethyl sulfoxide.

I claim:

1. A method of producing a cellulose enzyme which comprise growing the Eumyces mold organism ATCC 16425 in a sterile liquid nutrient medium containing sources of assimilable carbon and nitrogen at a temperature in the range of from about 45° C. to about 50° C. and precipitating the enzyme from the culture medium.

2. A method of producing an antibiotic substance which comprise growing the Eumyces mold organism ATCC 16425 in a sterile liquid nutrient medium containing sources of assimilable carbon and nitrogen at a temperature in the range of from about 45° C. to about 50° C. and separating the antibiotic substance from the culture medium.

3. A method of producing an anti-tumor substance which comprises growing the Eumyces mold organism ATCC 16425 in a sterile liquid nutrient medium containing sources of assimilable carbon and nitrogen at a temperature in the range of from about 45° C. to about 50° C. and separating the anti-tumor substance from the culture medium.

4. A method of producing a cellulase enzyme obtained by growing the Eumyces mold organism ATCC 16425 in a sterile liquid nutrient medium containing sources of assimilable carbon and nitrogen at a temperature in the range of from about 45° C. to about 50° C.

5. A method of producing an antibiotic substance obtained by growing the Eumyces mold organism ATCC 16425 in a sterile liquid nutrient medium containing sources of assimilable carbon and nitrogen at a temperature in the range of from about 45° C. to about 50° C.

6. A method of producing an anti-tumor substance obtained by growing the Eumyces mold organism ATCC 16425 in a sterile liquid nutrient medium containing sources of assimilable carbon and nitrogen at a temperature in the range of from about 45° C. to about 50° C.

References Cited

Basu et al.: Canadian Journal of Microbiology, vol. 6, pp. 265–282 (1960), article entitled "The Production of Cellulase by Fungi on Mixed Cellulosic Substrates."

LIONEL M. SHAPIRO, *Primary Examiner.*

U.S. Cl. X.R.

195—81